US009783631B2

(12) United States Patent
Soucek et al.

(10) Patent No.: US 9,783,631 B2
(45) Date of Patent: Oct. 10, 2017

(54) SYNTHESIS AND CHARACTERIZATION OF UV-CURABLE MALEIMIDE-TERMINATED IMIDE OLIGOMERS

(71) Applicants: Mark D. Soucek, Akron, OH (US); Jinping Wu, Cuyahoga Falls, OH (US)

(72) Inventors: Mark D. Soucek, Akron, OH (US); Jinping Wu, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/976,824

(22) Filed: Dec. 21, 2015

(65) Prior Publication Data
US 2016/0177018 A1   Jun. 23, 2016

Related U.S. Application Data

(60) Provisional application No. 62/094,126, filed on Dec. 19, 2014.

(51) Int. Cl.
*C08F 2/46* (2006.01)
*C08F 2/50* (2006.01)
*C08G 61/04* (2006.01)
*C08F 290/06* (2006.01)
*C08J 5/18* (2006.01)

(52) U.S. Cl.
CPC ............. *C08F 290/065* (2013.01); *C08J 5/18* (2013.01)

(58) Field of Classification Search
CPC .................................................... C08F 290/065
USPC ................. 522/138, 136, 135, 134, 1; 520/1
See application file for complete search history.

(56) References Cited

U.S. PATENT DOCUMENTS

| | | | | |
|---|---|---|---|---|
| 5,438,104 A * | 8/1995 | Kishi | ......................... | C08J 5/24 524/424 |
| 6,184,333 B1 * | 2/2001 | Gray | ...................... | C08G 73/10 525/420 |
| 6,410,611 B1 * | 6/2002 | Sakurai | ..................... | C08F 2/48 522/103 |
| 2008/0176167 A1 * | 7/2008 | Kawamori | ............. | C09J 179/08 430/271.1 |

* cited by examiner

*Primary Examiner* — Jessica E Whiteley
(74) *Attorney, Agent, or Firm* — Renner Kenner Greive Bobak Taylor & Weber

(57) ABSTRACT

Polyimide oligomer terminated with maleimide end groups may be cured by irradiation with UV light. The polyimide oligomer terminated with maleimide end groups may be cured in a polymerization mixture that includes a reactive diluent and optionally a photoinitiator. Due to the ability of the polyimide oligomer terminated with maleimide end groups to be cured with light applications the cured oligomer may be used in applications that require low temperatures.

13 Claims, 11 Drawing Sheets

SYNTHESIS AND CHARACTERIZATION OF UV-CURABLE MALEIMIDE-TERMINATED IMIDE OLIGOMERS

CROSS-REFERENCE TO RELATED APPLICATIONS

This application claims the benefit of U.S. Provisional Application No. 62/094,126 filed Dec. 19, 2014, the contents of which are incorporated herein by reference.

FIELD OF THE INVENTION

Embodiments are directed to maleimide-terminated imide oligomers, methods of preparing maleimide-terminated imide oligomers, and curing maleimide-terminated imide oligomers.

BACKGROUND OF THE INVENTION

Polyimides were first developed in 1955 as thermoplastics. The rigid aromatic ring provides a high glass transition temperature and good mechanical strength. Polyimides have been widely used in electric and space engineering due to their excellent thermal oxidative stability, chemical resistance, and low dielectric constant. Most thermoplastic aromatic polyimides in the fully imidized state are insoluble and infusible. Thus, polyimides are typically processed in the form of poly (amic acid) (PAA) precursors. After casting, the films or coatings are imidized state at evaluated temperature (~300° C.). The high processing temperature limits polyimide usage. Another problem with this process is that the PAA solution is sensitive to humidity, which may result in the chain scission during the storage period. In addition, the water released from the imidization process may cause voids in the products, especially when processing relatively high molecular weight polymers to produce thick films or composites. More recently, the thermoplastic polyimides have been developed with good solubility in common solvents, however a drawback of the soluble polyimides is the poor chemical resistance.

To ameliorate some of the processing issues with thermoplastic polyimides, thermosetting polyimides were developed by NASA in early 1960s. Thermosetting polyimides are usually low molecular oligomers with reactive functional groups on the backbone or side chain which crosslink upon heating. The reactive functional groups, such as nadimide, maleimide and acetylene, can undergo homo or copolymerization upon heating.

The high cross-linking temperature of polyamides is barrier that prevents there use beyond their current niche applications. Presently, there is a need in the art for polyimides and methods of curing polyamides at lower temperatures.

SUMMARY OF THE INVENTION

A first embodiment provides a method of curing a maleimide-terminated oligomer comprising irradiating, with UV light, a polymerization mixture comprising a polyimide oligomer terminated with maleimide end groups and a reactive diluent.

A second embodiment provides a method as in the first embodiment, where the UV light is a wavelength about 220 nm to about 600 nm.

A third embodiment provides a method as in the either the first or second embodiment, where the reactive diluent is selected from N,N-dimethylacrylamide and N-vinyl-2-pyrrolidone.

A fourth embodiment provides a method as in any of the first through third embodiments, where the polyimide oligomer terminated with maleimide end groups is about 1% to about 99% wt. of the polymerization mixture.

A fifth embodiment provides a method as in any of the first through forth embodiments, where the polyimide oligomer terminated with maleimide end groups is about 50% to about 90% wt. of the polymerization mixture.

A sixth embodiment provides a method as in any of the first through fifth embodiments, where the polymerization mixture further comprises a photoinitiator.

A seventh embodiment provides a method as in any of the first through sixth embodiments, where the polyimide oligomer terminated with maleimide end groups has a number average molecular weight of about 1,000 g/mole to about 25,000 g/mole.

An eighth embodiment provides a method as in any of the first through seventh embodiments, where the polyimide oligomer terminated with maleimide end groups includes units derived from a dianhydride compound and a diamine compound.

A ninth embodiment provides a method as in any of the first through eighth embodiments, where the diamine compound is derived from a diamine compound defined by the formula

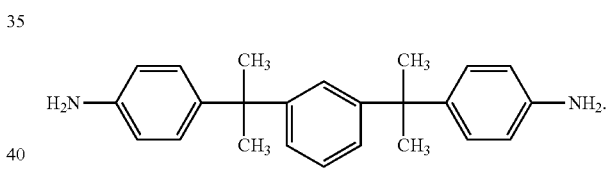

A tenth embodiment provides a method as in any of the first through ninth embodiments, where the dianhydride compound is derived from a dianhydride compound defined by the formula

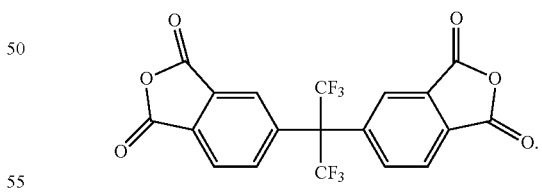

An eleventh embodiment provides a method as in any of the first through tenth embodiments, where the polyimide oligomer terminated with maleimide end groups is an aromatic or semi aromatic imide.

A twelfth embodiment provides a method as in any of the first through eleventh embodiments, where the polyimide oligomer terminated with maleimide end groups is defined by the formula

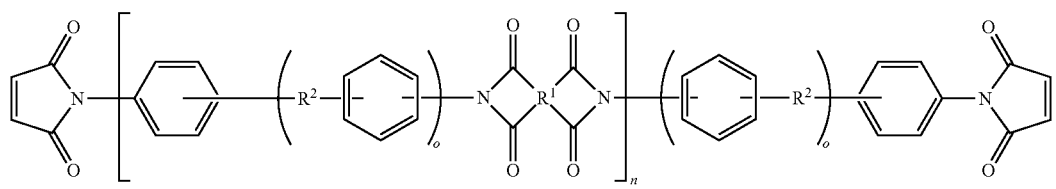

where each $R^1$ is individually an organic group, each $R^2$ is individually an organic group, an oxygen atom, or a bond, n is from about 1 to about 100, and each o is individually from about 1 to about 100.

A thirteenth embodiment provides a method as in any of the first through twelfth embodiments, where the polyimide oligomer terminated with maleimide end groups is defined by the formula

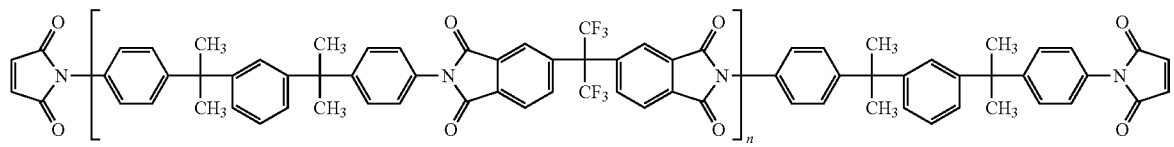

where n is from about 1 to about 100.

A fourteenth embodiment provides a method as in any of the first through thirteenth embodiments, where the polyimide oligomer terminated with maleimide end groups is cured at a temperature of about 0° C. to about 100° C.

DETAILED DESCRIPTION OF ILLUSTRATIVE EMBODIMENTS

Figure 1:
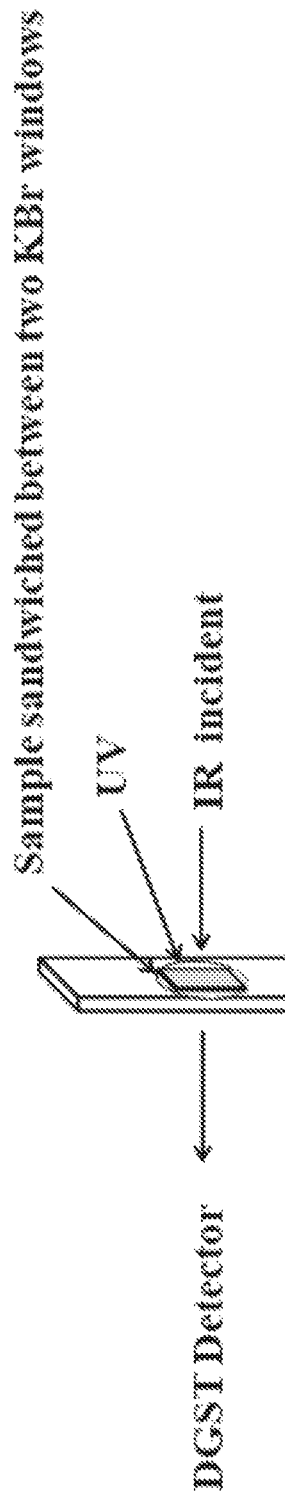
FIG. 1 provides a scheme of the Real-time FTIR spectroscopy experimental setup.

Embodiments are based, at least in part, on the discovery that maleimide-terminated imide oligomers may be cured with UV light. Advantageously, the resultant cured polyimide oligomers have properties such as thermal oxidative stability, chemical resistance, and a low dielectric constant that are similar to polyimides cured at high temperatures. The high glass transition temperature and the high maximum weight loss temperature make the cured maleimide-terminated imide oligomers a good material for high performance coating applications. Because high temperatures are not required, the ability to cure polyimides with UV light allows for a wider range of applications.

Suitable maleimide-terminated imide oligomers include imide oligomers with maleimide end groups terminating both ends of the oligomer. The oligomers have a number average weight that that is low enough to allow the maleimide-terminated imide oligomers to be processed prior to curing. The number average molecular weight may be determined by size exclusion chromatography (SEC) using polystyrene standards In one or more embodiments, the number average molecular weight of the maleimide-terminated imide oligomer is less than 25,000 g/mole, in other embodiments less than 20,000 g/mole, and in other embodiments less than 15,000 g/mole. In these or other embodiments, the number average molecular weight of the maleimide-terminated imide oligomer is greater than 1,000 g/mole, in other embodiments greater than 2,000 g/mole, and in other embodiments greater than 3,000 g/mole. In one or more embodiments, the number average molecular weight of the maleimide-terminated imide oligomer is from about 1,000 to about 25,000 g/mole, in other embodiments from about 2,000 to about 20,000 g/mole, and in other embodiments from about 3,000 to about 15,000 g/mole.

In one or more embodiments, a maleimide-terminated oligomer may be prepared by reacting a dianhydride compound with a diamine compound to form an oligomer with amic acid groups; reacting the oligomer with amic acid groups with maleic anhydride; and optionally performing a cyclodehydration reaction to imidize the amic acid groups of the oligomer with amic acid groups. In these or other embodiments, the maleimide-terminated imide oligomer includes units derived from a dianhydride compound and units derived from a diamine compound. As used herein, the term "derived from" may be used to describe the portion of a polymer (i.e. mer unit) that results from the polymerization of a monomer and optionally any secondary reactions required to prepare the final polymer.

As those skilled in the art will appreciate, maleic anhydride may be defined by the following formula

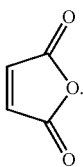

Suitable dianhydride compounds include those compounds with two anhydride groups linked or tethered by an organic group. In certain embodiments, the organic group linking the two anhydride groups may include halogen atoms. In one or more embodiments, one or both of the anhydride groups of the dianhydride compound may be included in a moiety as part of a ring. Examples moieties with anhydride groups as part of a ring include maleic anhydride, succinic anhydride, phthalic anhydride, glutaric anhydride, and tetrahydrophthalic anhydride.

In one or more embodiments, the dianhydride compound may be defined by the formula

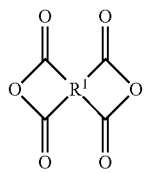

where $R^1$ is an organic group. In one or more embodiments, the organic group, $R^1$, includes aromatic groups. In one or more embodiments, suitable organic groups include hydrocarbon groups or substituted hydrocarbon groups with a suitable number of valences to form the attachments in the disclosed formula. Suitable hydrocarbon groups or substituted hydrocarbon groups may be linear, cyclic, or branched. In one or more embodiments, the hydrocarbon groups or substituted hydrocarbon groups may include 1 to about 30 carbon atoms, in other embodiments 6 to about 25 carbon atoms. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine.

In one or more embodiments, the dianhydride compound may be defined by the formula

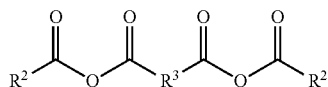

where each $R^2$ individually an organic group and $R^3$ is an organic group. one or more embodiments, the organic group, $R^3$, is an aliphatic group.

Specific examples of dianhydride compounds include, but are not limited to, pyromellitic dianhydride, 2,3,6,7-naphthalene tetracarboxylic dianhydride; 1,4,5,8-tetrafluoro-2,3,6,7-naphthalene tetracarboxylic dianhydride; 3,3',4,4'-biphenyl tetracarboxylic dianhydride; 2,2,5,5',6,6-hexafluorodiphenyl ether 3,3',4,4-tetracarboxylic dianhydride; 2,2',5,5,6,6'-hexafluorodiphenylmethane 3,3',4,4-tetracarboxylic dianhydride; benzophenone 3,3',4,4-tetracarboxylic dianhydride; 4,4,5,5,6,6'-hexafluorobenzophenone 2,2',3,3-tetracarboxylic dianhydride; and 2,2',5,5,6,6-hexafluorodiphenyl sulfone 3,3',4,4'-tetracarboxylic dianhydride.

In one or more embodiments, the dianhydride compound may be defined by the following formula

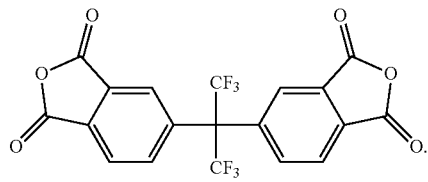 [SMILES: O=C1OC(=O)c2cc(C(c3ccc4c(c3)C(=O)OC4=O)(C(F)(F)F)C(F)(F)F)ccc21]

Suitable diamine compounds include those compounds with two amine groups. The two anhydride groups may be linked or tethered by an organic group. In one or more embodiments, the organic group that links or tethers the two anhydride groups may include aromatic groups. In other embodiments, the organic group that links or tethers the two anhydride groups may be an aliphatic group. In one or more embodiments, one or both of the amine groups may be part of an aniline group.

Specific examples of diamine compounds include, but are not limited to, meta-phenylene diamine; para-phenylene diamine; 2,2-bis(4-amino-phenyl)propane; 4,4'-diamino-dipheny-1 methane; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl)diethyl silane; bis-(4-amino-phenyl) diphenyl silane; benzindine; 3,3'-dichloro-benzidine; 3,3'-dimethoxy benzidine; bis-(4-amino-phenyl)ethyl phosphine oxide; -bis (4-amino-phenyl)phenyl phosphine oxide; bis (4-amino-phenyl) N-butylamine; bis(4-amino-phenyl)-N-methylamine; 1,5-diamino-naphthalene; 3,3-dimethyl-4,4'-diaminobiphenyl; N-(3-amino-phenyl)-4-aminobenzamide; and 4-aminophenyl-3-aminobenzoate.

In one or more embodiments, the diamine compound may be defined by the following formula

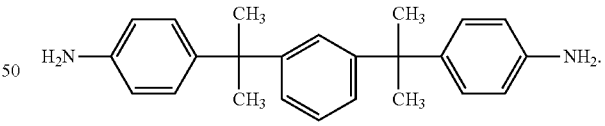

As noted above, a maleimide-terminated oligomer may be prepared by reacting a dianhydride compound with a diamine compound to form an oligomer with amic acid groups; reacting the oligomer with amic acid groups with maleic anhydride; and optionally performing a cyclodehydration reaction to imidize the amic acid groups of the oligomer with amic acid groups.

The reaction between the dianhydride compound and the diamine compound to form an oligomer with amic acid groups may be performed, for example, by mixing the dianhydride compound and the diamine compound in a polar aprotic solvent. Suitable polar aprotic solvents include dimethylacetamide (DMAc) and N-methyl-2-pyrrolidone (NMP). The reaction between the dianhydride compound and the diamine compound may be allowed to take place at room temperature (about 20° C. to about 25° C.).

The cyclodehydration reaction to imidize the amic acid groups of the oligomer with amic acid groups may be performed by heating the oligomer with amic acid groups in solution at elevated temperature (about 200° C. to about 300° C.).

In alternative embodiments, the maleimide-terminated oligomer may be prepared by high temperature solution imidization. In these or other embodiment, the diamine compound and dianhydride compound are mixed in a high boiling point aprotic solvent and allowed to react at a temperature of about 160° C. to about 180° C. Maleic anhydride may be added with the diamine compound and dianhydride compound or after they are allowed to react.

As noted above, the maleimide-terminated imide oligomers should have a number average molecular weight sufficiently low enough to allow for them to be processed. In one or more embodiments, the ratio of the dianhydride compound to the diamine compound may be used to prepare monomers of a predetermined number average molecular weight using the Carothers equation. In these or other embodiments, the maleimide-terminated imide oligomers should be prepared using excess diamine compounds. In or more embodiments, ratio of the dianhydride compound to the diamine compound may be from about 1:5 to about 49 to 50.

In one or more embodiments, the maleimide-terminated imide oligomer may be defined by the formula

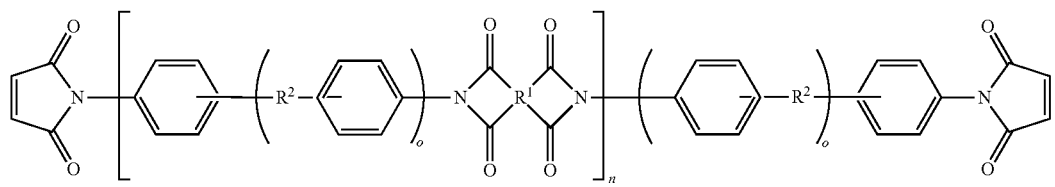

where each $R^1$ is individually an organic group, each $R^2$ is individually an organic group, an oxygen atom, or a bond, n may be from about 1 to about 100, and each o may be individually from about 1 to about 100. In these or other embodiments, n may be from about 2 to about 20, and in other embodiments from about 3 to about 17. In these or other embodiments, o may be from about 2 to about 20, and in other embodiments from about 3 to about 17.

In one or more embodiments, the maleimide-terminated imide oligomer may be defined by the formula

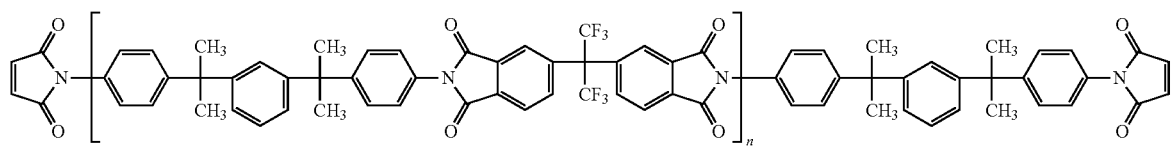

where n is from about 1 to about 100. In these or other embodiments, n may be from about 2 to about 20, and in other embodiments from about 3 to about 17.

Generally, the maleimide-terminated imide oligomer may be cured by irradiating, with UV light, a polymerization mixture comprising a polyimide oligomer terminated with maleimide end groups and a another monomer that reacts to connect via a polymerization reaction the maleimide end groups. Optionally, the polymerization mixture further comprises a photoinitiator that produces free radicalize when excited.

In one or more embodiments, a maleimide-terminated oligomer may be cured by irradiating, with UV light, a polymerization mixture comprising a polyimide oligomer terminated with maleimide end groups and a reactive diluent. Those skilled in the art will appreciate that a reactive diluent is a monomer capable of solubilizing the maleimide-terminated oligomer and also participates in the reaction to cure maleimide-terminated oligomer by reacting with the maleimide end groups. Suitable reactive diluents include, but are not limited to, N,N-dimethylacrylamide and N-vinyl-2-pyrrolidone.

As noted above, the use of UV light to cure the a maleimide-terminated oligomer allows for use in low temperature applications. Generally, low temperature application are those application that require a temperature under 300° C. In these or other embodiments, the maleimide-terminated oligomer may be cured at a temperature less than 300° C., in other embodiments less than 200° C., in other embodiments less than 100° C., in other embodiments less than 50° C., and in other embodiments less than 40° C. In one or more embodiments, the maleimide-terminated oligomer may be cured at a temperature greater than −10° C., in other embodiments less than 0° C., in other embodiments less than 5° C., in other embodiments less than 10° C., and in other embodiments less than 20° C.

In one or more embodiments, the maleimide-terminated oligomer may be cured at a temperature of about −10° C. to about 300° C., in other embodiments of about 0° C. to about 200° C., in other embodiments of about 5° C. to about 100° C., in other embodiments of about 10° C. to about 50° C., and in other embodiments of about 20° C. to about 40° C.

In one or more embodiments, the UV light used to irradiate the polymerization mixture has a wavelength of about 220 nm to about 600 nm, in other embodiments about 250 nm to about 400, and in other embodiments from about 280 nm to about 380 nm.

The polymerization mixture may be characterized by the weight percentage of the maleimide-terminated oligomer in the polymerization mixture. In one or more embodiments, the polyimide oligomer terminated with maleimide end groups is about 1% to about 99% wt, in other embodiments from about 50% to about 95%, and in other embodiments from about 70% to about 90% of the polymerization mixture.

In one or more embodiments, the cured maleimide-terminated oligomer may be characterized by its glass transition temperature (Tg), which may be measure by photo-differential scanning calorimetry. In one or more embodiments, the cured maleimide-terminated oligomer has a glass transition temperature of greater than 100° C., in other embodiments greater than 120° C., and in other embodiments greater than 135° C. In one or more embodiments, the cured maleimide-terminated oligomer has a glass transition temperature of less than 220° C., in other embodiments less than 200° C., and in other embodiments less than 185° C. In one or more embodiments, the cured maleimide-terminated oligomer has a glass transition temperature of about 100° C. to about 220° C., in other embodiments of about 120° C. to about 200° C., and in other embodiments of about 135° C. to about 185° C.

In one or more embodiments, the cured maleimide-terminated oligomer may be characterized by its thermal decomposition temperature, which may be measure by thermo gravimetric analysis with heating rating of 20° C./min. In one or more embodiments, the cured maleimide-terminated oligomer has a maximum thermal decomposition temperature of greater than 200° C., in other embodiments greater than 250° C., and in other embodiments greater than 300° C. In one or more embodiments, the cured maleimide-terminated oligomer has a maximum thermal decomposition temperature of less than 700° C., in other embodiments less than 650° C., and in other embodiments less than 600° C. In one or more embodiments, the cured maleimide-terminated oligomer has maximum thermal decomposition temperature of about 200° C. to about 700° C., in other embodiments of about 250° C. to about 650° C., and in other embodiments of about 300° C. to about 600° C.

In one or more embodiments, the cured maleimide-terminated oligomer may be characterized by its % thermal decomposition at 400° C., which may be measure by thermo gravimetric analysis with heating rating of 20° C./min. In one or more embodiments, the cured maleimide-terminated oligomer has a percent decomposition at 400° C. of greater than 75%, in other embodiments greater than 80%, and in other embodiments greater than 85%. In one or more embodiments, the cured maleimide-terminated oligomer has a percent decomposition at 400° C. of less than 99%, in other embodiments less than 97%, and in other embodiments less than 90%. In one or more embodiments, the cured maleimide-terminated oligomer has a percent decomposition at 400° C. of about 75% to about 99%, in other embodiments of about 80% to about 97%, and in other embodiments of about 85% to about 90%.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

2. Experimental 2.1. Materials

N-Methyl-2-pyrrolidinone (NMP) (anhydrous, 99.5%, dried over molecular sieve) dimethylacrylamide (DMAA) (99%), N-vinylpyrrolidone (NVP) (>99%), w-xylene (anhydrous, >99%) and methanol (ACS reagent, 99.8%) were purchased from Sigma-Aldrich. 4,4-(hexafluoroisopropylidene) diphthalic anhydride (6FDA) (purity >99%) was purchased from Akron Polymer Systems, Inc (Akron, Ohio) and recrystallized from acetic anhydride and dried under vacuum at 160° C. for 24 h before use. Maleic anhydride (>95%) was purchased from Sigma-Aldrich and recrystallized from toluene before use. 4, 4'-(1,3-phenylenediisopropylidene) w-bisaniline was obtained from Mitsui Chemicals Inc. and vacuum dried before use. Irgacure 184 was obtained from Ciba. All of the other reagents and solvents are commercially available ACS reagents and were used without further purification.

2.2. Instrumentation and Characterization

Size exclusion chromatography (SEC) with tetrahydrofuran as the mobile phase was used to determine polymer molecular weight and polydispersity index (PDI) using a Waters 1515 isocratic pump, three Waters styragel columns (HR 3, HR 4, HR 4E) and a Waters 2414 refractive index detector. The columns were calibrated with narrow-distribution polystyrene standards. FTIR spectra were recorded on a Thermo Scientific Nicolet 380 Fourier transform infrared spectrometer by casting thin film on KBr crystal from chloroform solution. Data spacing is 4 $cm^{-1}$, resolution is 32. UV-vis spectra were recorded on a Perkin-Elmer Model LS-5 spectrometer. The maleimides and reactive diluents were diluted in acetonitrile to obtain UV-Vis data. $^1$H NMR and $^{13}$C NMR were recorded on Mercury-300 spectrometer (Varian) in chloroform-d.

UV radiation was performed on a bench top conveyor LC-6 with an ultraviolet lamp system (Fusion UV systems, Inc). The Fusion lamp system uses microwave radiation to energize the lamp. Intensity was measured by a UV POWER PUCK® high energy UV integrating radiometer. Thermal stability was studied on a TGA 2950, (TA Instruments, Inc). Samples were put on platinum pan and heated up with a heating rating of 20° C./min. Nitrogen was used as the furnace purging gas. The decomposition temperature and the first derivative were reported. The glass transition temperature ($T_g$) was measured by DSC Q-200 (TA Instruments, Inc). DSC thermograms were obtained by using 3-5 mg samples were sealed in aluminum hermetic DSC pans and heated from room temperature at heating rate of 10° C./min. The value of the glass transition temperature (Tg) was taken as the midpoint of the transition region using TA Universal Analysis. DMA test was performed on DMA Q-80 (TA Instruments, Inc). Films were tested under the following conditions: tension mode, heating rate of 3° C./min, and a frequency of 1 Hz. The maximum of the tan δ transition was used to determine the $T_g$, while the cross-link density was determined by utilizing the storage modulus (E') in the rubbery plateau ($T_g$+50° C.). The cross-link density of the film has been defined as the moles of elastically effective network chains per cubic meter of film. The cross-link density was calculated by using the following equation derived from the theory of rubber elasticity.

$$v_e = \frac{E'}{3RT} \quad (1)$$

where $v_e$ is crosslink density, R is the gas constant, T is the absolute temperature and f is the value of storage modulus in the rubbery plateau.

For gel content measurements, the films were subjected to Soxhlet extraction in chloroform for 24 h, followed by drying under vacuum at 80° C. for 5 h. The gel content of UV cured film was determined gravimetrically using an analytical balance. XRD (Bruker AXS D8) equipped with a copper target tube and a two-dimensional detector was used to characterize the structure of the imide oligomers. The X-ray generator was operated at 40 kV and 40 mA using monochromatized CuKa radiation with a wavelength of 1.5418 Å.

UV-curing process was monitored by real-time FTIR spectrometer and photo-DSC. The instrument setup for the real-time FTIR is shown in FIG. 1. The formulation was sandwiched between two KBr crystals, IR illumination was at normal incidence to the sample, and UV radiation was applied at an angle of 30°-45° to the normal. During the UV radiation, the spectrum was acquired at each 1.03 s sampling interval. The transmission mode spectral series collection coupled with data processing using Thermo Scientific software named OMNIC got the conversion vs. time profiles. The continuous change of a specific absorbance reflected the reaction extent. The conversion of each monomer can be calculated according to equation (2).

$$\text{Conversion \%} = \frac{A_0 - A_t}{A_0} \times 100 \quad (2)$$

where, $A_0$ is the IR absorbance before UV radiation, $A_t$ is the IR absorbance after UV radiation for t seconds.

For photo-DSC measurement, samples were analyzed on a DSC Q-2000 (TA Instrument) equipped with a photo-calorimetric accessory (PCA), Novacure N2001-A1 as UV-light source. The wavelength ranged from 250 to 600 nm and the initiation light source was a 100 W high-pressure mercury short-arc lamp with an intensity of 50 mW·cm$^{-2}$. The samples were placed in uncovered hermetic aluminum DSC pans and polymerization reactions were run isothermally at 40° C., the total heat released during the polymerization was recorded.

2.2.1. Synthesis of Maleimide-Terminated Imide Oligomers

A typical polymerization procedure for maleimide-terminated imide oligomer with an average molecular weight of 1300 g/mol is as followed: A two-necked round bottom flask with a magnetic stirrer and nitrogen inlet was flame dried under a steady flow of nitrogen. Anhydrous NMP (20 g) and bisaniline (3.44 g, 0.01 mol) were charged to the flask. The mixture was stirred under nitrogen flow until completely dissolving the bisaniline. Then, 6FDA (2.22 g, 0.005 mol) was gradually added into the diamine solution. The mixture was stirred under nitrogen atmosphere while the anhydride was gradually dissolved. Maleic anhydride (0.98 g, 0.01 mol) was added one hour later. Once the reaction solution became homogeneous, the reaction continued at room temperature and nitrogen atmosphere for 20 h, and a clear, yellow poly (amic acid) solution was obtained. Anhydrous m-xylene (15 mL) was added to the solution, and a Dean-Stark trap was also filled with m-xylene. Hydroquinone (0.1 wt %) was also added to the solution as an inhibitor. The solution was heated to 165° C. and the reaction was continued for an additional 6 h. After that, the solution was cooled to room temperature and the imide oligomers were precipitated in 800 mL of methanol under a high speed mechanical stir. After the filtration, the product was washed with methanol and dried in the vacuum oven for 48 h at 100° C. Average yield is approximately 78 wt %. The details are shown in Table 1.

TABLE 1

Materials used in synthesis of maleimide-terminated imide (MTI) oligomers

| Sample Name | 6FDA | | Bisaniline | | NMP | Maleic anhydride | | Xylene | Hydroquinone | Yield |
|---|---|---|---|---|---|---|---|---|---|---|
| | g | mol | g | mol | g | g | mol | mL | g | wt % |
| MTI-2k | 2.22 | 5.0 * 10$^{-3}$ | 3.44 | 1.0 * 10$^{-2}$ | 20.0 | 0.98 | 1.0 * 10$^{-2}$ | 15.0 | 6.6 * 10$^{-2}$ | 78.0 |
| MTI-5k | 8.88 | 2.0 * 10$^{-2}$ | 9.30 | 2.7 * 10$^{-2}$ | 54.5 | 1.37 | 1.4 * 10$^{-2}$ | 60.0 | 2.0 * 10$^{-2}$ | 72.0 |
| MTI-10k | 2.22 | 5.0 * 10$^{-3}$ | 1.72 | 5.0 * 10$^{-3}$ | 25.3 | 0.04 | 4.4 * 10$^{-4}$ | 15.0 | 4.0 * 10$^{-3}$ | 89.2 |

2.3. Formulation and Film Preparation

Glass panels were used as the substrate for film preparation. The substrates were cleaned with acetone and dried before casting. Due to the solubility limit of imide oligomers in reactive diluents, imide oligomer concentration of 50 wt % was chosen. The formulations were made by thoroughly mixing 2 g of synthesized oligomers with 2 g of reactive diluents, NVP and DMAA, respectively, in glass vials at room temperature thoroughly until transparent solution was obtained. The chemical structures of the reactive diluents used in formulation are shown in Scheme 1. For imide oligomer and DMAA formulation, free radical photoinitiator (3 wt %) was also added. The films were cast on a glass substrate using a drawdown bar with a thickness of 200 μm (8 mil). The films were exposed (UV) twice at belt speed of 5 feet/min, which afforded a light intensity of 1300 Mw/cm$^2$.

Scheme 1 Chemical structures of reactive diluents

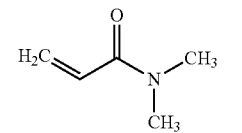

N,N-dimethylacrylamide (DMAA)

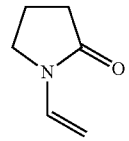

N-vinyl-2-pyrrolidone (NVP)

Results

The objective of this study is to develop imide oligomers for UV-curing application. Oligomers with three different molecular weights were synthesized. The molecular weight ranged from 1300 g/mol to 9200 g/mol. The bisaniline and 6FDA were chosen as monomer, because of the increase in solubility for prospective reactive diluents and thermal stability of synthesized oligomers. The reactive diluents, DMAc and NMP, were selected on the basis of matching solubility parameters with the polyimide oligomer. The effects of molecular weight of imide oligomers and reactive diluents on the properties of UV-cured films were investigated.

3.1. Synthesis of Imide Oligomers

Maleimide-terminated telechelic imide oligomers with controlled molecular weight were synthesized from 6FDA and bisaniline through a high temperature solution imidization route. Molecular weight was controlled by adjusting the ratio of the two monomers. Diamine was present in slight excess. The polymerization then proceeded to a point at which dianhydride was completely used up and all the chain ends possessed the amine group. Maleic anhydride was used to end-cap the oligomer. In order to properly control the molecular weight, precisely adjusting the stoichiometric imbalance of the difunctional monomer is quite important. Synthetic route is shown in Scheme 2.

Theoretical molecular weight was calculated based on Equation (3). The number average ($\overline{M}_n$), weight-average molecular weights ($\overline{M}_w$), and the polydispersity index (PDI) of imide oligomers were characterized by SEC, as shown in Table 2.

TABLE 2

Molecular weight of maleimide-terminated imide oligomers

| Sample | Theoretic MW | n | $\overline{M}_n$ | $\overline{M}_w$ | PDI ($\overline{M}_w/\overline{M}_n$) |
|---|---|---|---|---|---|
| MTI-2k | 1300 | 1 | 2600 | 5200 | 2.0 |
| MTI-5k | 5200 | 6 | 5500 | 11000 | 2.0 |
| MTI-10k | 9200 | 11 | 10000 | 24000 | 2.3 |

FTIR spectra were obtained for both starting materials and synthesized imide oligomers. Two distinct absorptions at 3300-3500 cm-1 were attributed to the amine group in bisaniline. For 6FDA and maleic anhydride, two absorbance bands at around 1830 cm$^{-1}$ and 1770 cm$^{-1}$ were characteristic absorption of anhydride. The absorptions appearing at approximately 1780 cm$^{-1}$, 1720 cm$^{-1}$, 1375 cm$^{-1}$ and 720 cm-1 confirmed the presence of imide groups. Two absorptions appearing at approximately 1780 cm$^{-1}$ and 1720 cm$^{-1}$

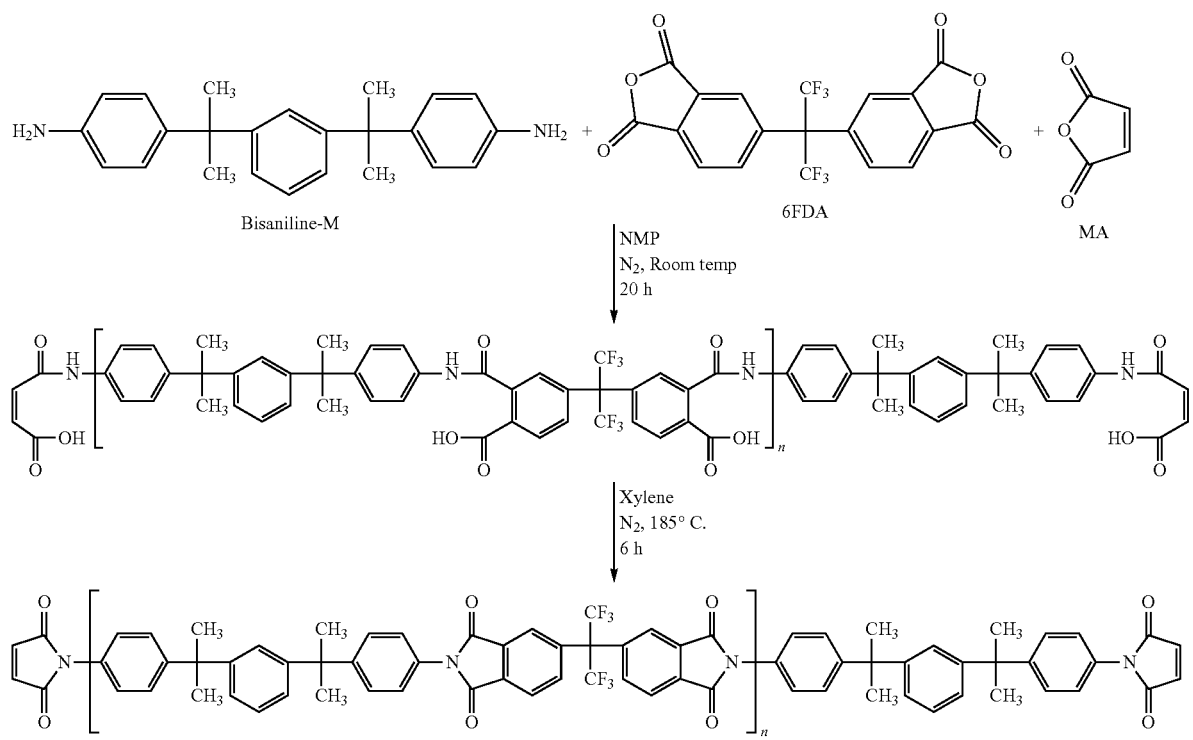

Scheme 2 Synthetic route for one or more embodiments of maleimide-terminated imide oligomer The stoichiometric ratio of monomers was varied according to the Carothers Equation in order to achieve desired molecular weight.

$$\overline{X}_n = \frac{1+r}{1-r} \quad (3)$$

were attributed to C═O asymmetrical and symmetrical stretching. One distinct absorbance occurring at 1375 cm$^{-1}$ was attributed to C—N stretch vibration. Absorption at around 720 cm$^{-1}$ was due to the C═O bending. In addition, the lack of absorbance near 3300 cm$^{-1}$ indicated a high degree of imidization.

The $^1$H NMR spectrum of a maleimide-terminated (6FDA-Bisaniline)-MTI imide oligomers (I) was determined. A proton resonance located at δ 6.78 ppm is associated with the protons on the maleimide group. Resonance located at δ 7.1-8.2 ppm was due to aromatic protons, and resonance located at δ 1.7 ppm was due to the protons on methyl groups in bisaniline. The $^{13}$C NMR spectrum of a maleimide-terminated (6FDA-Bisaniline)-MTI imide oligomers (I) was also determined. The spectral region exhibited resonance at δ 135.8 ppm, which was attributed to the vinyl carbons on maleimide groups. The carbon resonances located at δ 30.9 ppm and δ 42.7 ppm were due to the methyl carbons and quaternary carbons in bisaniline. The carbonyl group appeared at δ 162.6 ppm and δ 167.1 ppm.

The chemical structure of the maleimide-terminated imide oligomer is shown in Scheme 2. The calculated solubility parameter of the imide oligomer is 24.3 MPa$^{1/2}$, while the solubility parameters of DMAc and NMP are 22.1 MPa$^{1/2}$ and 23.1 MPa$^{1/2}$, respectively. The chemical structures of the reactive diluents DMAA and NVP used in the formulation are similar to the DMAc and NMP. Thus, the solubility parameter of reactive dilutes are close to the imide oligomer studied.

3.2. Solubility Behavior

The predication of the solubility parameter was performed using the group contribution method based on the following equation:

$$\delta = \left(\frac{\Sigma E_i}{\Sigma V_i}\right)^{1/2} \quad (4)$$

where $E_i$ is the additive atomic and group contribution of the repeating unit of cohesive energy and $V_i$ is the additive atomic and group contribution of the repeating unit of molar volume. Since the materials were of low molecular weight, the cohesive energy was considered as additive property. The values of $E_i$ and $V_i$ obtained from J. Brandrup, et al., "Polymer Handbook (4th Edition)," ed: John Wiley & Sons, which is incorporated herein by reference, are shown in Table 3 and the theoretical solubility parameter was calculated based on equation (1). Chemical structure of maleimide-terminated imide oligomer is shown in Scheme 2. The calculated solubility parameter of the imide oligomer was 24.3 MPa$^{1/2}$, while the solubility parameters of the solvent tested are listed in Table 3.

TABLE 3

Solubility parameter calculated by group contribution

| Group | $E_i$(J/mol) | $V_i$(cm$^3$/mol) |
|---|---|---|
| —CH3 | 4710 | 33.5 |
| Phenylene | 31940 | 52.4 |
|  | 1470 | −19.2 |
| CF3 | 4270 | 57.5 |
| =CH— | 4310 | 13.5 |
| Ring closure 5 atom | 1050 | 16 |
| Phenyl(trisubstituted) | 31940 | 33.4 |
| C=O | 17370 | 10.8 |
|  | 4190 | −9.0 |

TABLE 3-continued

Solubility parameter calculated by group contribution

| Group | $E_i$(J/mol) | $V_i$(cm$^3$/mol) |
|---|---|---|
| Σ | $\Sigma E_i = 477630$ | $\Sigma V_i = 809.6$ |
| δ (MPA$^{1/2}$) | $\delta = \left(\dfrac{\Sigma E_i}{\Sigma V_i}\right)^{1/2} = 24.3$ | |

3.3. UV Absorbance of Imide Oligomers

Figure 2:
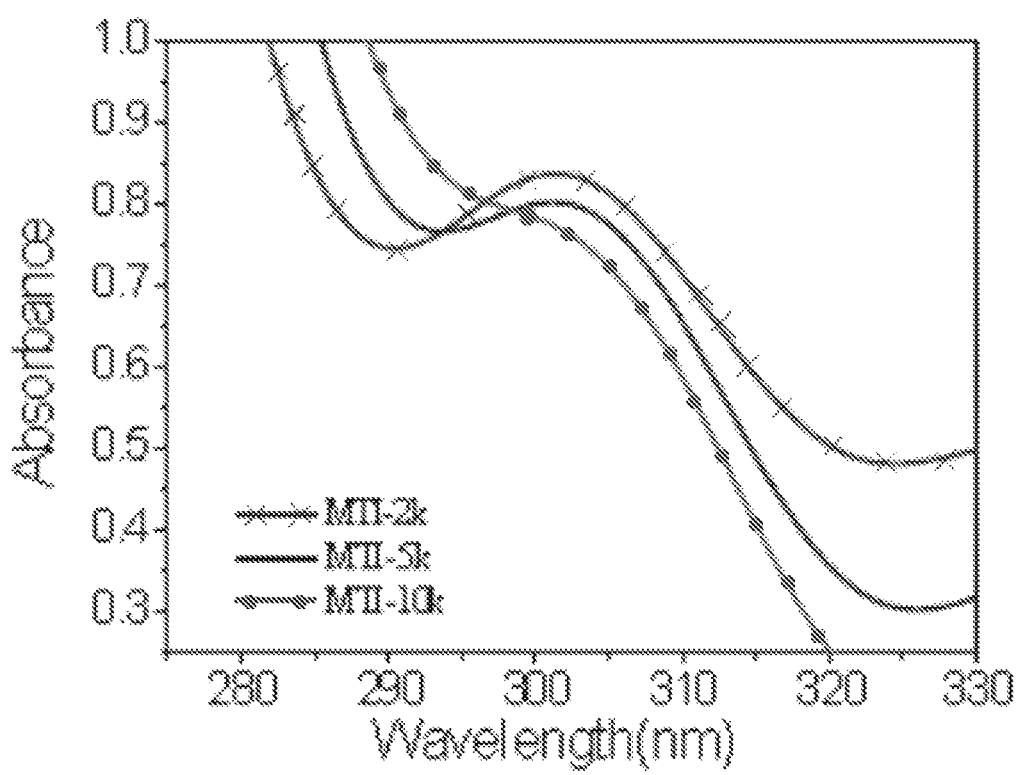
FIG. 2 provides a UV absorption spectra of one or more embodiments of maleimide-terminated imide oligomers in acetonitrile.

Since the maleimide oligomers were to be used as photoinitiators, it was useful to obtain UV-Vis spectra as shown in FIG. 2. The absorbance wavelength must match the emitting wavelength of the source. The maleimide-terminated imide oligomer exhibits a UV absorbance in the 300 nm region. as shown in FIG. 2. For imide oligomer with $\overline{M}_n$~10 k, a weak absorbance is observed. As the molecular weight decreased, the absorbance increased. This is a consequence of increasing the maleimide concentration.

3.4. Photo-DSC

Figure 3:
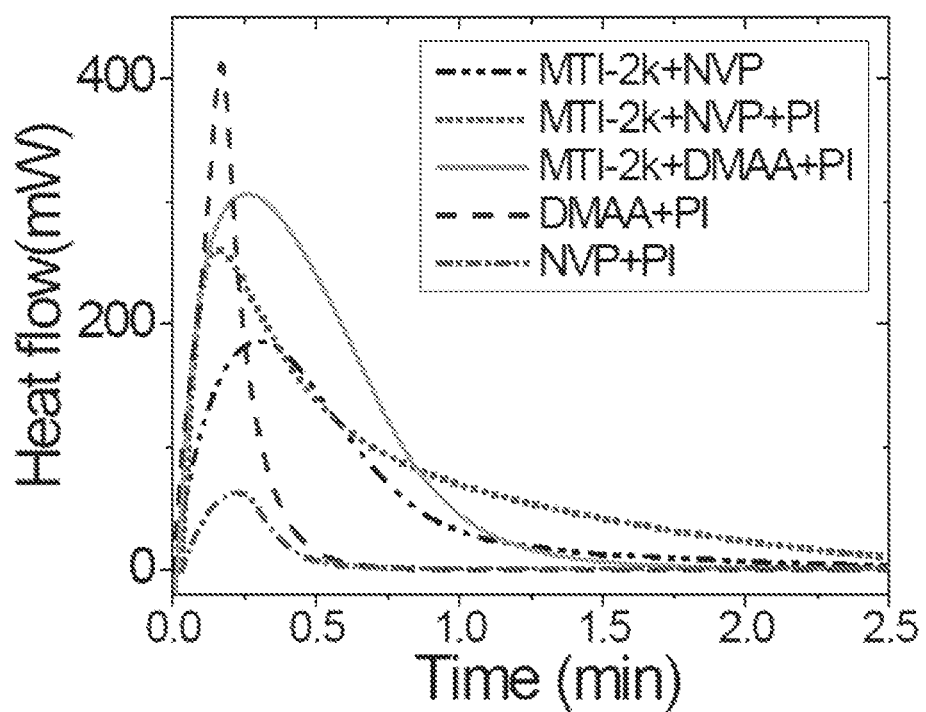
FIG. 3 provides a chart of the photo-DSC of one or more embodiments maleimide-terminated imide oligomer with reactive diluents.
Figure 4:
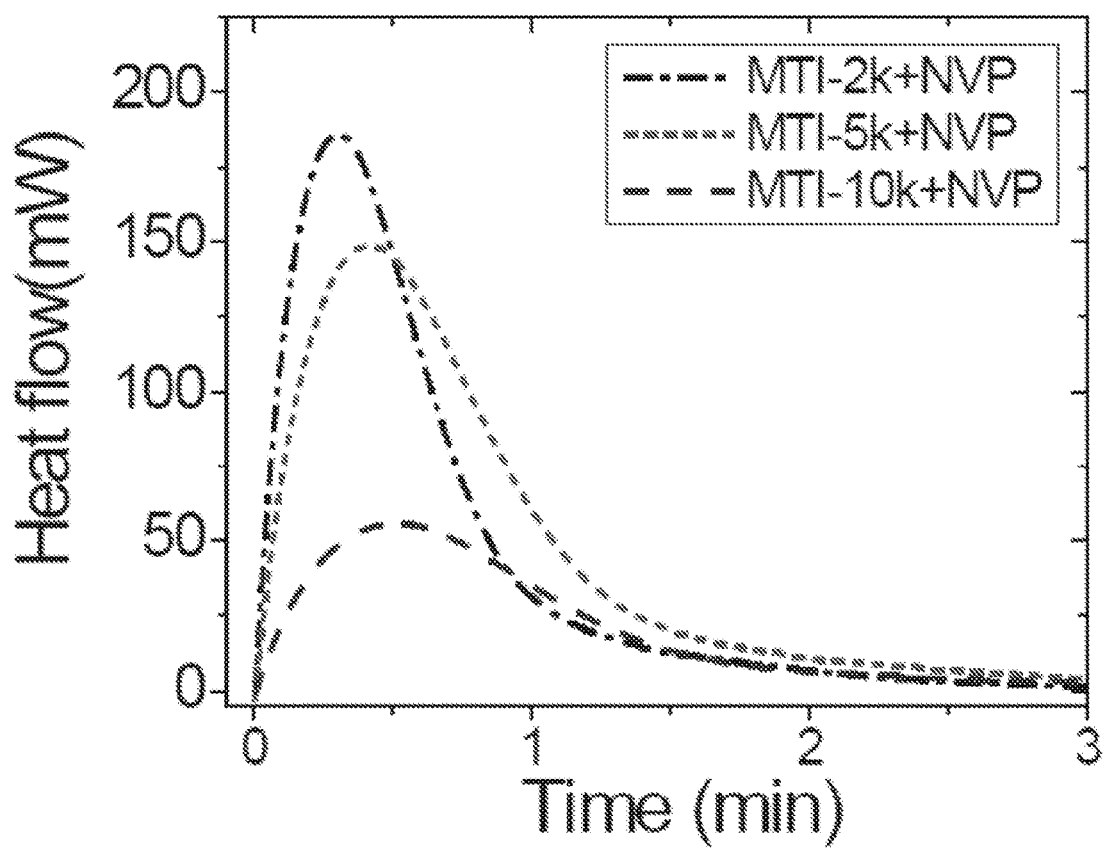
FIG. 4 provides a chart of the photo-DSC of one or more embodiments of cured maleimide-terminated imide oligomers with NVP.

Photo-DSC was used to investigate the reactions of imide oligomers with reactive diluents. In FIG. 3, maleimide-terminated imide oligomer MTI (I) and NVP without photoinitiator exhibited an exotherm upon UV exposure. After adding photoinitiator, MTI (I)/NVP formulation showed increased reaction rate. Homopolymerization of NVP with free radical photoinitiator was also observed. Influence of the molecular weight of Imide oligomers on photopolymerization MTI/NVP formulations are shown in FIG. 4. The oligomer with lower molecular weight showed a higher reaction rate and a larger amount of heat released during polymerization. Only the maleimide imide oligomer MTI with DMAA did not show any exotherm upon UV exposure.

An exothermic peak was observed after adding photoinitiators to the MTI (I)/DMAA formulation. It was attributed to the free radical homopolymerization of the DMAA. This broad exothermic peak was attributed to the photopolymerization of maleimide group with DMAA as well as the homopolymerization of the maleimide-terminated imide oligomer. The heat of polymerization and the maximum reaction time as determined by photo-DSC are listed in Table 4. By adding photoinitiator, the overall conversion was increased by 6-13% for MTI/NVP formulations. Meanwhile, the time to reach the maximum reaction rate ($t_{max}$) also increased for MTI/NVP formulation after the photoinitiator was added.

TABLE 4

Heat of polymerization and maximum reaction time as determined by photo-DSC

| Sample Name | ΔH/J/g | $t_{max}{}^a$/s | Conversion/% |
|---|---|---|---|
| BMT-2k/NVP | 338.1 ± 5.3 | 18.0 ± 2.2 | 80.5 ± 0.7 |
| BMT-5k/NVP | 308.6 ± 7.4 | 25.2 ± 5.6 | 78.2 ± 3.3 |
| BMT-10k/NVP | 258.4 ± 11.8 | 28.8 ± 6.0 | 66.9 ± 2.5 |
| BMT-2k/NVP + PI | 373.2 ± 13.5 | 9.5 ± 1.5 | 88.9 ± 1.6 |
| BMT-5k/NVP + PI | 328.3 ± 9.4 | 17.3 ± 4.4 | 83.2 ± 2.3 |
| BMT-10k/NVP + PI | 293.0 ± 4.5 | 19.6 ± 4.9 | 75.8 ± 2.1 |
| BMT-2k/DMAA | 458.6 ± 15.0 | 14.4 ± 0.5 | 98.5 ± 0.7 |
| BMT-5k/DMAA | 427.6 ± 9.2 | 15.2 ± 0.9 | 97.1 ± 1.2 |

TABLE 4-continued

Heat of polymerization and maximum reaction time as determined by photo-DSC

| Sample Name | ΔH/J/g | $t_{max}{}^a$/s | Conversion/% |
|---|---|---|---|
| BMT-10k/DMAA | 403.6 ± 22.4 | 17.4 ± 1.3 | 93.4 ± 2.0 |
| DMAA | 458.6 ± 15.2 | 3.0 ± 0.5 | 98.8 ± 1.9 |
| NVP | 224.4 ± 10.5 | 17.4 ± 2.2 | 59.4 ± 0.6 |

$^a$time to maximum rate of cure

3.5. Real Time FTIR Spectroscopy

Real-time FTIR spectroscopy is one of the most efficient ways to study the photopolymerization kinetics of monomers or oligomers through monitoring the change of their characteristic absorbances upon heating or UV radiation. Compared to photo-DSC, which records the overall heat flux of the formulation, real-time FTIR has the capability to obtain kinetics for each reactive group in the formulation. The real-time FTIR spectrum of photoinitiator free maleimide oligomers (II) and NVP formulation was determined. After UV-exposure and without any additional photoinitiator, a continuous decreasing of absorbance of double bond in NVP was observed.

TABLE 5

Reaction kinetics data derived from real-time FTIR

| Sample | Conversion of MTI (%) | Conversion of reactive diluents (%) | Maximum reaction rate of MTI/s$^{-1}$ | Maximum reaction rate of reactive diluents/s$^{-1}$ |
|---|---|---|---|---|
| MTI-2k/NVP | 91.1 ± 1.1 | 80.3 ± 0.7 | 4.7 ± 0.1 | 4.9 ± 0.4 |
| MTI-5k/NVP | 79.7 ± 2.3 | 60.8 ± 1.5 | 4.0 ± 0.2 | 3.6 ± 0.2 |
| MTI-10k/NVP | 58.6 ± 0.6 | 47.9 ± 0.9 | 3.1 ± 0.1 | 2.9 ± 0.1 |
| MTI-2k/NVP + PI | 94.1 ± 0.3 | 84.3 ± 1.3 | 4.9 ± 0.1 | 5.0 ± 0.3 |
| MTI-5k/NVP + PI | 88.7 ± 0.7 | 62.6 ± 0.7 | 4.7 ± 0.3 | 3.7 ± 0.7 |
| MTI-10k/NVP + PI | 62.8 ± 1.4 | 54.5 ± 1.2 | 3.7 ± 0.1 | 3.1 ± 0.5 |
| MTI-2k/DMAA | 90.3 ± 1.2 | 99.1 ± 1.3 | 13.3 ± 0.7 | 15.5 ± 1.1 |
| MTI-5k/DMAA | 66.5 ± 0.8 | 88.2 ± 0.6 | 9.7 ± 0.6 | 13.4 ± 1.3 |
| MTI-101/DMAA | 63.4 ± 0.7 | 83.4 ± 1.1 | 10.1 ± 0.8 | 12.4 ± 0.9 |

Figure 5A:
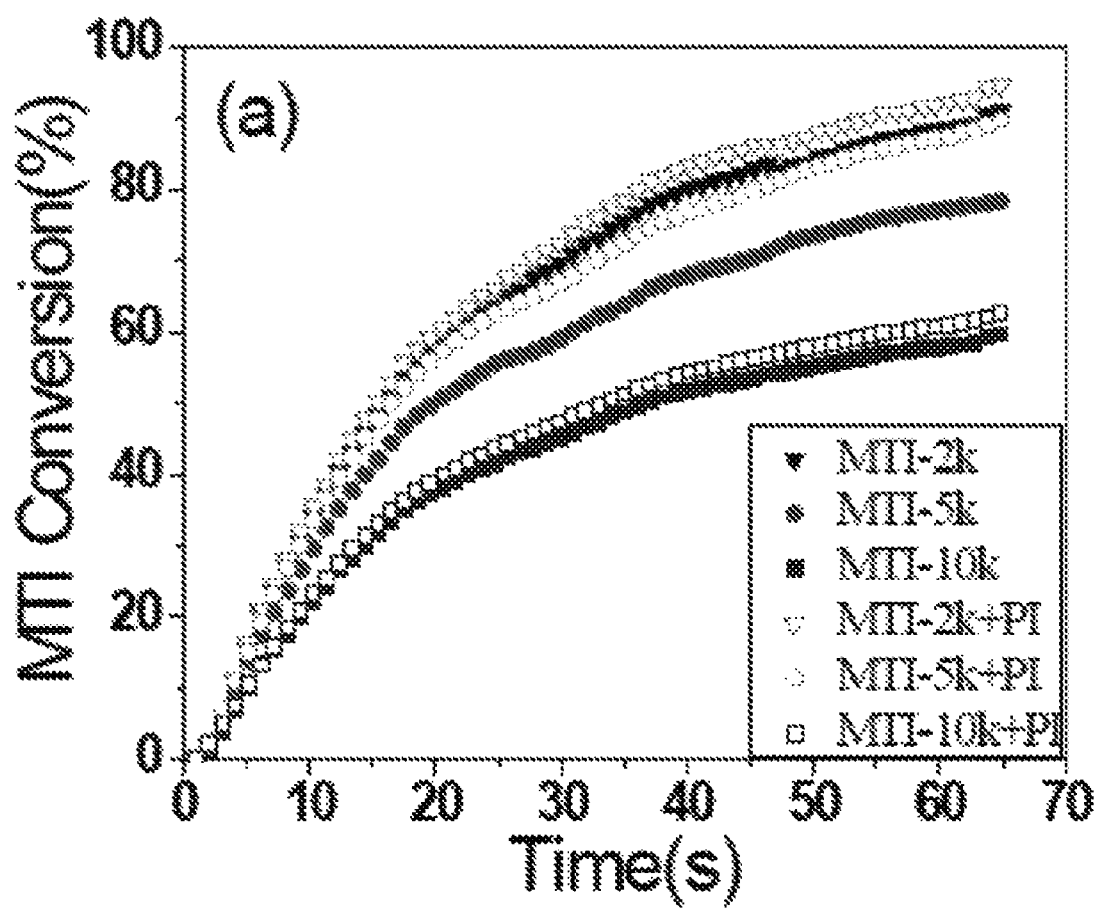
FIG. 5A provides a chart of the conversation vs. time profiles of one or more embodiments maleimide-terminated imide oligomer.
Figure 5B:
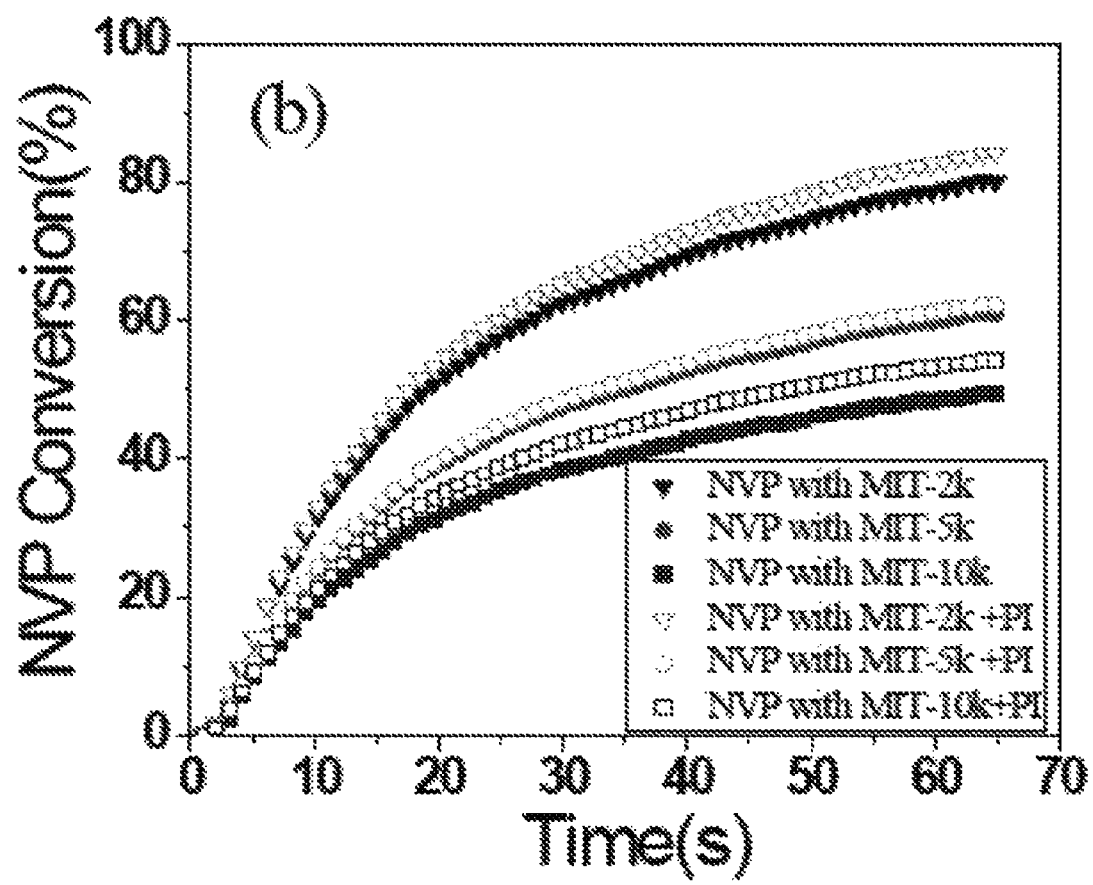
FIG. 5B provides a chart of the conversation vs. time profiles of one or more embodiments maleimide-terminated imide oligomer in MTI/NVP formulations.

The curing process of maleimide-terminated imide oligomers with reactive diluents was investigated using real-time FTIR. The profiles of conversion vs. time were obtained based on the decreasing of specific absorbance. FIGS. 5A and 5B display the photopolymerization of maleimide-terminated imide oligomers and NVP formulation with and without photoinitiator. The reaction rate and final conversion were both increased after adding photoinitiator. Higher molecular weight of the imide oligomer exhibited lower conversion. This was attributed to the lower concentration of the maleimide group, which could result in the lower absorbance and initiation ability under the UV radiation. This was also consistent with the results from the UV-Vis spectroscopy. A similar trend was observed in FIGS. 6A and 6B for the imide oligomer with DMAA systems. With regards to the photo polymerization rate, a similar slope of conversion vs. time curve was observed, which means the polymerization rate of maleimide-terminated oligomer and NVP were same. This result was consistent with photopolymerization of maleimide/vinyl ether pair results studied by Jonsson and Decker.

Figure 6A:
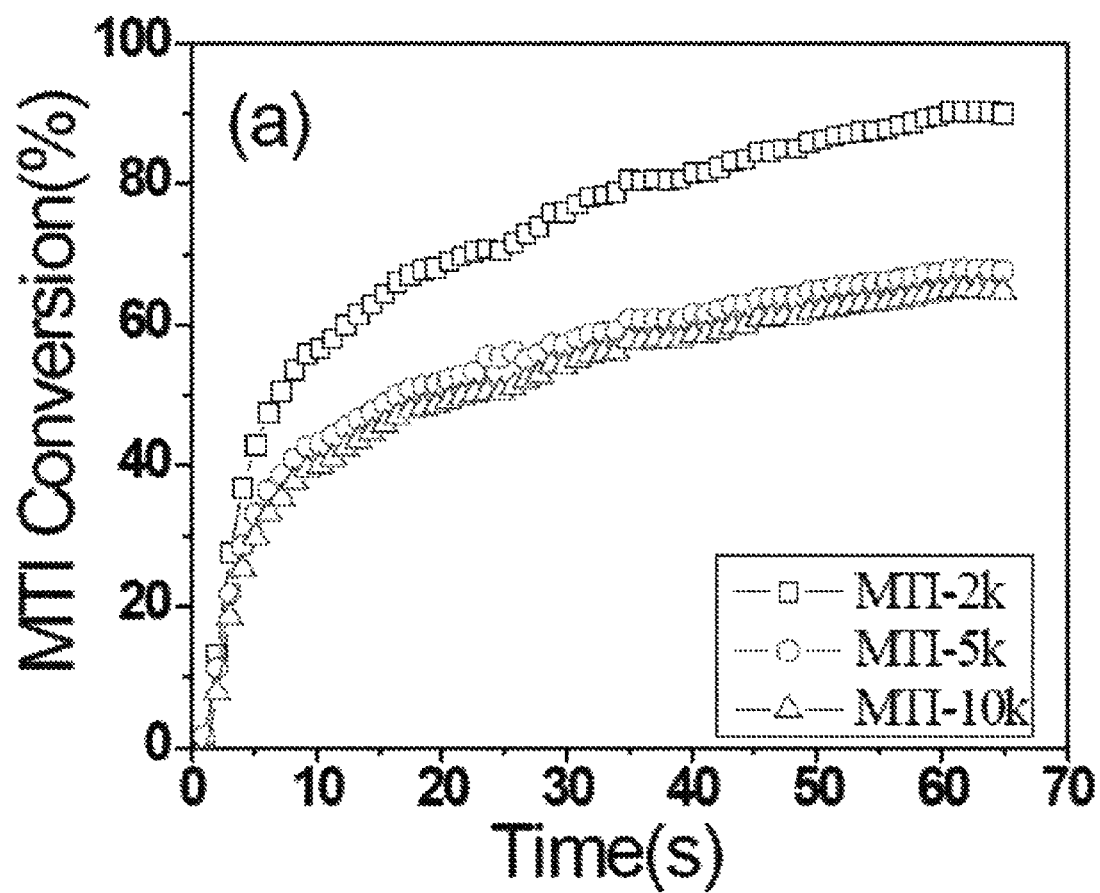
FIG. 6A provides a chart of the conversation vs. time profiles of one or more embodiments maleimide-terminated imide oligomer.
Figure 6B:
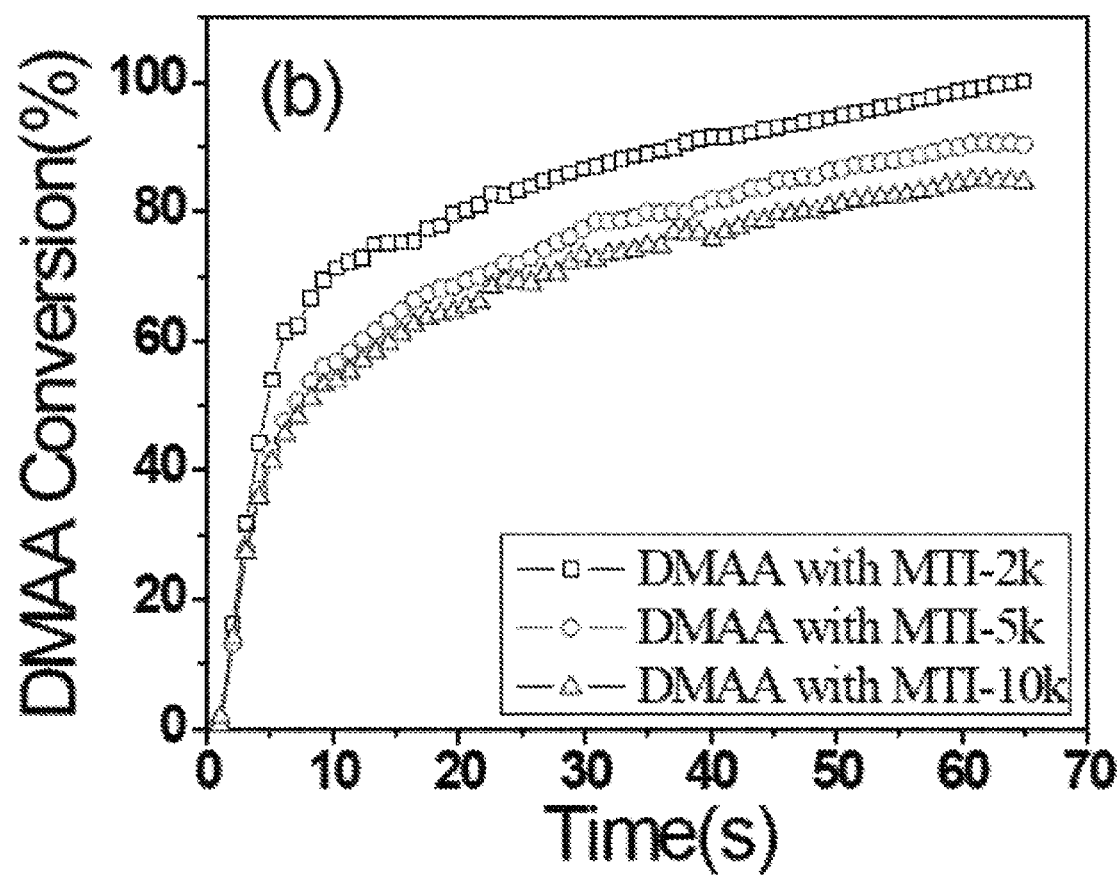
FIG. 6B provides a chart of the conversation vs. time profiles of one or more embodiments maleimide-terminated imide oligomer in MTI/DMAA formulations.

FIGS. 6A and 6B show the photopolymerization of maleimide-terminated imide oligomers with DMAA. For photopolymerization of DMAA, as free radical photoinitiator was added into the systems, higher reaction rate was observed. Although the maleimide group is photosensitive and can initiate photopolymerization without any additional photoinitiator, the relatively lower concentration of the maleimide group was present in the system. The free radical photoinitiator was added in order to get a relatively fast curing speed and a higher conversion of the system. From FIG. 6B, it was observed that DMAA had a high conversion (40%) within 5 s. After 65 s of UV exposure, ~90% conversion was achieved for DMAA in the oligomer (I), while more than 80% conversion was obtain for the other two formulations. The relatively low conversion was attributed to the high molecular weight induced high viscosity and low molecular mobility. Lower conversion and lower curing speed was observed for imide oligomer, when compared to DMAA. Approximately 60% of maleimide conversion was achieved after 65 s UV exposure for oligomer (II) and oligomer (III). As expected, a higher conversion was obtained for oligomer (I), which was due to the lower viscosity and higher chain mobility. The reaction kinetics data derived from the real time FTIR are listed in Table 5.

3.6. Thermal Analysis

The glass transition temperature of the imide oligomer and UV cured films of imide oligomers with reactive diluents was measured by DSC. Table 6 lists the glass transition temperature of imide oligomers. A lower glass transition temperature was observed for the lower molecular weight sample, which was the imide oligomer (I) $\overline{M}_n$ (~2667 g/mol). The glass transition temperature increased from 163° C. to 199° C. with increasing molecular weight. This was consistent with the Flory-Fox Equation about the relationship of number-average molecular weight $\overline{M}_n$, and the glass transition temperature Tg. For UV cured films of imide oligomers with reactive diluents, glass transition temperature was lower compared to the neat imide oligomers. This was due to the reactive diluents with lower glass transition temperature were incorporated into the system. The glass transition temperatures of homopolymers of DMAA and NVP were 89° C. and 54° C., respectively. Glass transition temperature of UV cured films with DMAA and NVP as reactive diluents were also measured, as shown in Table 6. Glass transition temperature of UV cured (6FDA-Bisaniline)-MTI/DMAA films ranged from 141° C. to 131° C. The glass transition temperatures for the UV cured (6FDA-Bisaniline)-MTI/NVP films, were slightly lower, changed from 143° C. to 109° C.

Figure 7:
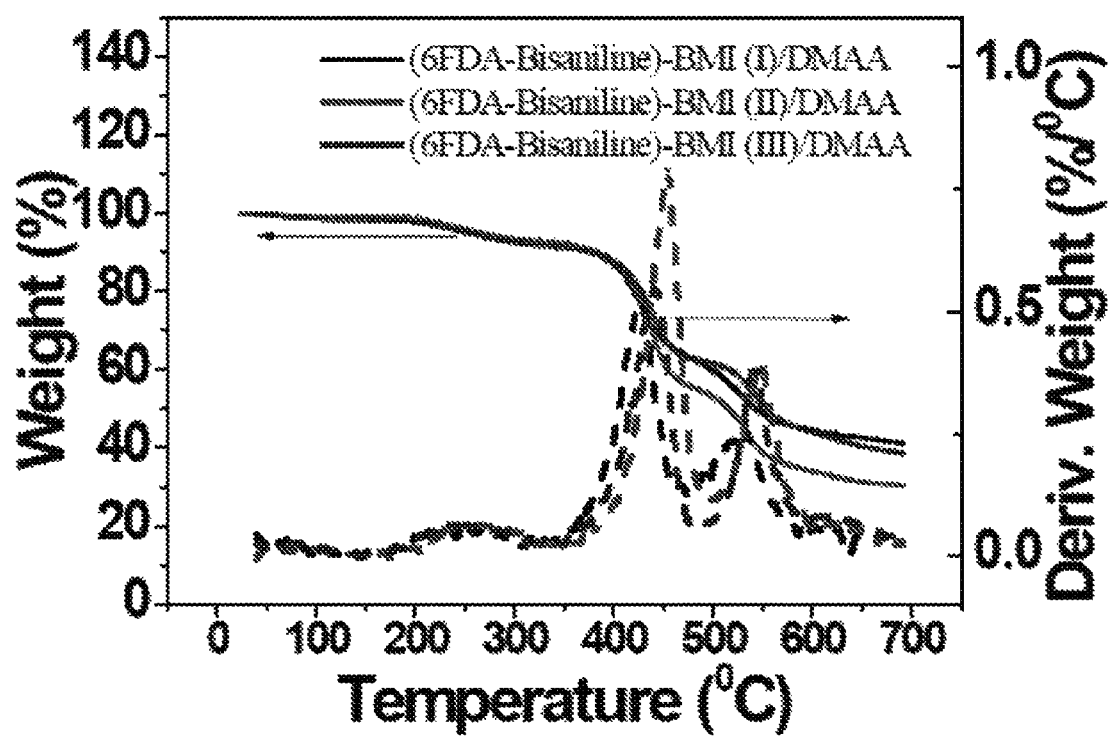
FIG. 7 provides a TGA thermogram of UV cured (6FDA-Bisaniline)-MTI/DMAA films.

Thermal stability of UV cured imide oligomers with reactive diluents was also studied by TGA. FIG. 7 shows the TGA thermograms of UV cured (6FDA-Bisanline)-MTI/

Figure 8:
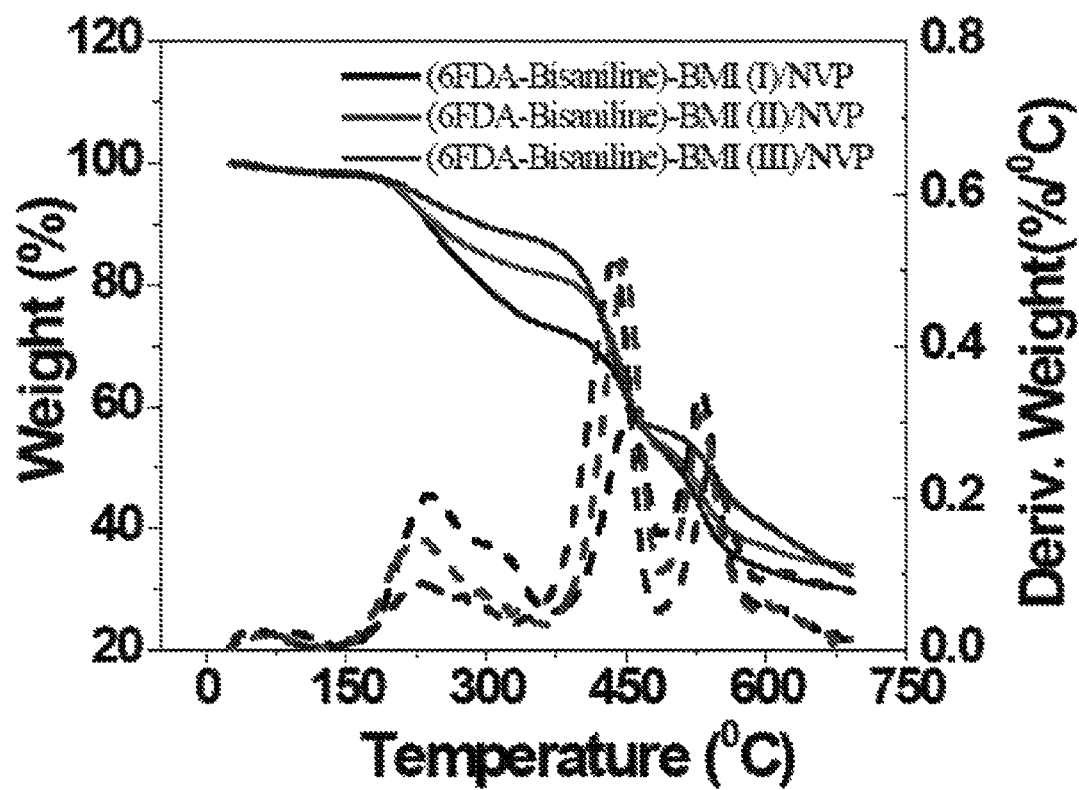
FIG. 8 provides a TGA thermogram of UV cured (6FDA-Bisaniline)-MTI/NVP films.
Figure 9:
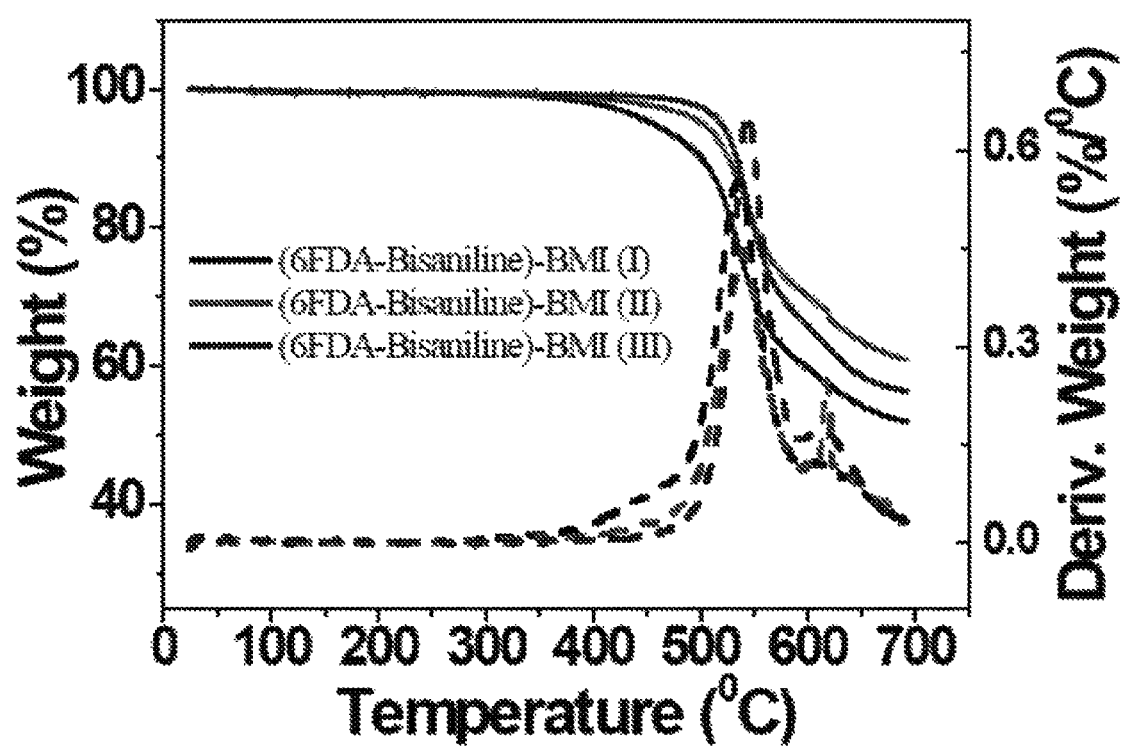
FIG. 9 provides a TGA thermograms of (6FDA-Bisaniline)-MTI.

DMAA films. All the films were thermally stable up to 400° C. The maximum thermal decomposition temperature ($T_{dmax}$) was found to be around 453° C. and 550° C. for imide oligomer MTI-5k with DMAA. The weight decrease below 400° C. was due to the low molecular weight reactive diluents in the system. Since the UV curing process was a very fast compared to the thermal cross-linking, small molecular might be trapped inside of the solid network when the liquid formulation turned into solid films in a very short time. Upon increasing the temperature, these low molecules reactive diluents would evaporate first. However, the weight was relatively stable between 200° C. to 400° C., which means the covalent bonds in the oligomer chain and the bonds formed after cross-linking reaction did not break. The loss of the part of unreacted diluents did not significantly affect the stability of the crosslinked network and the films were still thermally stable. The maximum weight loss at 427° C. was attributed to the break of the crosslinked network. For UV cured (6FDA-Bisanline)-MTI/NVP films, TGA thermograms are shown in FIG. 8. 5 wt % weight loss temperatures (T5%) for all films were at ~220° C. Compared to (6FDA-Bisaniline)-MTI/DMAA films, maximum weight loss temperature for UV cured oligomer with NVP was lower, at around 230° C. This was because a small amount of monomeric NVP, still presented in the system after UV radiation. By adding photoinitiator to the system, the thermal stability of the MTI/NVP films were enhanced, which was shown in the increase of the maximum weight loss temperature. TGA thermograms of neat maleimide-terminated oligomer were shown in FIG. 9. Glass transition temperatures and thermal decomposition temperature of the copolymers are shown in Table 6.

TABLE 6

Thermal properties of UV cured film

| Sample | $T_g$* (° C.) | Width of $T_g$ (° C.) | $T_{5\%}$ (° C.) | $T_{dmax1}$ (° C.) | $T_{dmax2}$ (° C.) | Weight @400° C. (%) |
|---|---|---|---|---|---|---|
| MTI-2k | 163.1 ± 0.8 | 4.2 ± 0.3 | 452 | 536 | 615 | 97 |
| MTI-2k/DMAA | 141.3 ± 1.0 | 33.5 ± 1.1 | 242 | 427 | 531 | 87 |
| MTI-2k/NVP | 143.5 ± 0.4 | 16.7 ± 0.7 | 220 | 236 | 435 | 72 |
| MTI-2k/NVP + PI | 144.6 ± 0.3 | 18.1 ± 0.4 | 235 | 310 | 475 | 73 |
| MTI-5k | 180.9 ± 1.1 | 8.5 ± 0.3 | 494 | 540 | 618 | 99 |
| MTI-5k/DMAA | 135.5 ± 0.9 | 36.6 ± 1.2 | 242 | 453 | 550 | 87 |
| MTI-5k/NVP | 109.6 ± 1.0 | 24.6 ± 0..7 | 220 | 230 | 446 | 79 |
| MTI-5k/NVP + PI | 123.8 ± 0.4 | 21.7 ± 0.5 | 240 | 317 | 527 | 75 |
| MTI-10k | 199.4 ± 1.3 | 6.0 ± 0.3 | 520 | 543 | 613 | 100 |
| MTI-10k/DMAA | 131.4 ± 1.2 | 42.2 ± 1.6 | 242 | 442 | 541 | 87 |
| MTI-10k/NVP | 136.7 ± 0.2 | 19.5 ± 1.0 | 226 | 228 | 436 | 82 |
| MTI-10k/NVP + PI | 137.1 ± 0.7 | 22.1 ± 0.9 | 239 | 325 | 447 | 85 |

*$T_g$ was measured by DSC

3.7. Viscoelastic Properties

The cross-link densities of UV cured films were calculated based on DMA measurements. The glass transition temperature (Tg), storage modulus (E'), crosslink density, and the maximum tan δ for UV cured films are listed in Table 7. The Tg of the cross-linked films was obtained from the maximum of tan δ. For UV cured MA-(6FDA-Bisaniline)-MTI/DMAA film, the glass transition temperature decreased from 163° C. to 141° C. The cross-link density of UV cured film from oligomer (III)/DMAA with $\overline{M}_n$~10 k g/mol had the highest value of 290 mol/m3. This was due to the high mole ratio of the DMAA in the cured films, which significantly increased the cross-link density. For UV cured (6FDA-Bisaniline)-MTI/NVP film, cross-link density had the similar trend. Two transitions were observed from the tan δ vs. temperature curves of (6FDA-Bisaniline)-MTI/DMAA films. This was due to the homopolymerization of two components in the formulation. For (6FDA-Bisaniline)-MTI/NVP films, only one broad transition was observed.

TABLE 7

Properties of UV cured film by DMA and gel content

| Sample | Min Storage modulus E' (MPa) | Cross-link density (mol/m³) | $T_g$ by DMA (° C.) | Max. Tan δ | Gel content (wt. %) |
|---|---|---|---|---|---|
| MTI(I)/DMAA | 1.75 | 152 | 163 | 0.72 | 91.5 |
| MTI(II)/DMAA | 0.91 | 79 | 151 | 0.74 | 97.0 |
| MTI(II)/DMAA | 3.35 | 290 | 141 | 0.68 | 92.7 |
| MTI(I)/NVP | 3.13 | 259 | 159 | 0.64 | 81.5 |
| MTI(II)/NVP | 0.72 | 60 | 134 | 0.71 | 83.5 |
| MTI(III)/NVP | 6.14 | 508 | 145 | 0.61 | 70.3 |
| MTI(I)/NVP + PI | 3.39 | 273 | 162 | 0.70 | 85.5 |
| MTI(II)/NVP + PI | 1.65 | 145 | 137 | 0.79 | 89.5 |
| MTI(III)/NVP + PI | 6.65 | 528 | 149 | 0.82 | 80.3 |

3.8. Structure Analysis

The X-ray diffraction patterns of imide oligomers are shown was determined. All samples exhibited some degree of ordered structure with three major peaks at 2θ~4.2°, 2θ~15.8° and 2θ~26.7°. The diffraction peak at 2θ~26.7° was related to d-spacing of 3.34 Å, the diffraction peak at 2θ~15.8° was related to the d-spacing of 5.61 Å, and the diffraction peak at 2θ~4.2° was related to d-spacing of 21.04 Å. The first diffraction peak located at 2θ~4.2° represented the monomer repeat distance of ~21.04 Å along the extended chain distance. A smectic-like layer of monomer repeat units might exist, but the conformation of the chain was not fully extended. After UV curing, the films were also studied by X-ray defraction. The diffraction peak at 2θ~4.2° became broad due to the existence of the reactive diluents in the cured film which disturb the ordering pack of the monomer units. The diffraction peak at 2θ~26.7° was disappeared and only a wide amorphous peak was observed.

The morphology of the UV cured film was observed using AFM. The films coated on the silicon wafer were exposed to UV radiation for cross-linking and after that the phase contrast image were captured. Two phases were observed in both films.

What is claimed is:

1. A method of curing a maleimide-terminated oligomer comprising:

irradiating, with UV light, a polymerization mixture comprising a polyimide oligomer terminated with maleimide end groups and a reactive diluent at a temperature of about 0° C. to about 100° C.;

where the reactive diluent solubilizes the maleimide-terminated oligomer and also participates in the reaction to cure maleimide-terminated oligomer by reacting with the maleimide end group.

2. The method of claim 1, where the UV light is a wavelength about 220 nm to about 600 nm.

3. The method of claim 1, where the reactive diluent is selected from N,N-dimethylacrylamide and N-vinyl-2-pyrrolidone.

4. The method of claim 1, where the polyimide oligomer terminated with maleimide end groups is about 1% to about 99% wt of the polymerization mixture.

5. The method of claim 1, where the polyimide oligomer terminated with maleimide end groups is about 50% to about 90% wt of the polymerization mixture.

6. The method of claim 1, where the polymerization mixture further comprises a photoinitiator.

7. The method of claim 1, where the polyimide oligomer terminated with maleimide end groups has a number average molecular weight of about 1,000 g/mole to about 25,000 g/mole.

8. The method of claim 1, where the polyimide oligomer terminated with maleimide end groups includes units derived from a dianhydride compound and a diamine compound.

9. The method of claim 8, where the diamine compound is derived from a diamine compound defined by the formula

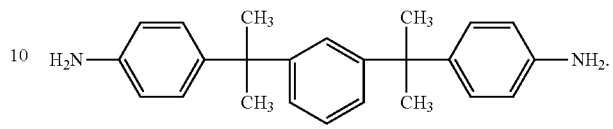

10. The method of claim 8, where the dianhydride compound is derived from a dianhydride compound defined by the formula

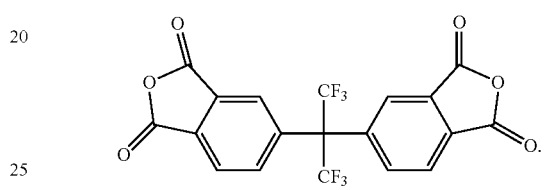

11. The method of claim 1, where the polyimide oligomer terminated with maleimide end groups is an aromatic or semi aromatic imide.

12. The method of claim 1, where the polyimide oligomer terminated with maleimide end groups is defined by the formula

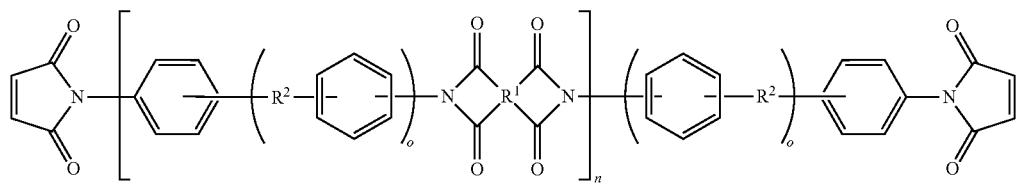

where each $R^1$ is individually an organic group, each $R^2$ is individually an organic group, an oxygen atom, or a bond, n is from about 1 to about 100, and each o is individually from about 1 to about 100.

13. The method of claim 1, where the polyimide oligomer terminated with maleimide end groups is defined by the formula

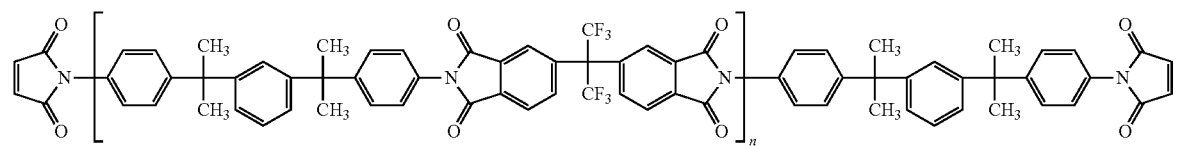
where n is from about 1 to about 100.
* * * * *